(12) United States Patent
Dutta

(10) Patent No.: US 6,658,402 B1
(45) Date of Patent: Dec. 2, 2003

(54) WEB CLIENT CONTROLLED SYSTEM, METHOD, AND PROGRAM TO GET A PROXIMATE PAGE WHEN A BOOKMARKED PAGE DISAPPEARS

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,849

(22) Filed: Dec. 16, 1999

(51) Int. Cl.[7] .................... G06F 17/30; G06F 15/00; G06F 15/16
(52) U.S. Cl. .................... 707/2; 715/512; 709/217
(58) Field of Search .................... 707/1–5, 10, 104.1, 707/500–526, 6, 102; 709/212–217, 223, 203, 219, 226, 229, 224, 227, 100–103; 345/738, 760, 853; 715/512–516

(56) References Cited

U.S. PATENT DOCUMENTS

| | | | |
|---|---|---|---|
| 5,813,007 A | | 9/1998 | Nielsen .................... 707/10 |
| 5,918,239 A | | 6/1999 | Allen et al. .................... 707/526 |
| 5,958,008 A | | 9/1999 | Pogrebisky et al. .................... 709/223 |
| 6,163,778 A | * | 12/2000 | Fogg et al. .................... 707/10 |
| 6,182,122 B1 | * | 1/2001 | Berstis .................... 709/217 |
| 6,191,786 B1 | * | 2/2001 | Eyzaguirre et al. .................... 345/853 |
| 6,195,679 B1 | * | 2/2001 | Bauersfeld et al. .................... 709/203 |
| 6,256,648 B1 | * | 7/2001 | Hill et al. .................... 707/501 |
| 6,285,999 B1 | * | 9/2001 | Page .................... 707/5 |
| 6,334,145 B1 | * | 12/2001 | Adams et al. .................... 709/217 |
| 6,411,952 B1 | * | 6/2002 | Bharat et al. .................... 707/5 |

FOREIGN PATENT DOCUMENTS

| | | |
|---|---|---|
| EP | 0 889 418 | 1/1999 |
| GB | 0 330 430 | 4/1999 |
| JP | 11-31150 | 2/1999 |

OTHER PUBLICATIONS

"Virtual URLs for Browsing and Searching Large Information Spaces", Research Disclosure 9/98, n41392, p. 1238.
INSPEC Abstract No. C1999–03–7210N–021: Formal description and appliatoi nof fuzzy URL.
INSPEC Abstract No. C9712–7210–032: "Uniform resource identifiers and the effort to bring "bibliographic control" to the Web: an overview of current progress".
UK9–97–012 (IBM UK Patent Application #9811895.3, filed Jun. 4, 1998 (pending).

* cited by examiner

Primary Examiner—Safet Metjahic
Assistant Examiner—Te Yu Chen
(74) Attorney, Agent, or Firm—Marilyn Smith Dawkins

(57) ABSTRACT

A system, method and program of the invention enables an alternate page to be received by a client when the desired page is not found at a Web server. Other pages that were close to the desired page in terms of hyperlink hops are stored along with the bookmark for a page. This is done in the background in the spare cycles of the client by creating a site-map which indicates the hyperlink structure of a Web site containing the desired page. Chains of hyperlinks from the desired page back to the root or home page are then stored along with the bookmark at the time of bookmarking. If a page disappears from the site, the links in the chain are followed back from that page to the root page until a next available page is found. On clicking a bookmark, if the page is not found, another close page is obtained by the client.

14 Claims, 3 Drawing Sheets

WEB CLIENT CONTROLLED SYSTEM, METHOD, AND PROGRAM TO GET A PROXIMATE PAGE WHEN A BOOKMARKED PAGE DISAPPEARS

BACKGROUND OF THE INVENTION

1. Field of the Invention

This invention relates to bookmarking pages at a client, and more specifically for enabling the client to get a next nearest page when the bookmarked page is not available from the Server.

2. Description of the Related Art

The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

A bookmark in a Web client, e.g., the Web browser IE5 or Netscape Navigator, is the address of a Web site that a user stores for later use. More specifically, a user clicks on this address to reach the Web file instead of typing the full address. Unfortunately, the Web is a dynamic environment where Web server sites are often updated and their pages rearranged. Consequently, if a user clicks on a previously stored bookmark that is no longer valid, an error code is returned from the Web Server. Typically, the error code returned as defined by the HTTP Protocol for such as situation is "404: Not Found" as explained in the excerpt below from the HTTP standard:

404 Not Found

The server has not found anything matching the Request-URI. No indication is given of whether the condition is temporary or permanent. The 410 (Gone) status code SHOULD be used if the server knows, through some internally configurable mechanism, that an old resource is permanently unavailable and has not forwarding address. This status code is commonly used when the server does not wish to reveal exactly why a request has been refused, or when no other response is applicable.

Some Web sites are friendlier, and return additional information. For example, when a reference is made to a non-existing page on www.ibm.com, the following is returned:

Our Apologies

The document you have requested does not exist on this system.

Please check the URL and try again or use our search function in the menu bar to find the information you are looking for. If you believe you have received this message in error, please use the Contact link on this page to report this error.

404 multifail

Some Web browsers have a feature that when the URL is not found (be it from a bookmark or from some text typed in by a user), they search to find something that is close to the URL. For example, IE4 finds http://www.microsoft.com when "microsoft" is requested. Generally, such results are not very beneficial. Typically, the results are only helpful for finding the server name and results from categories kept in portal sites. For example, requesting "altavista", or a bookmark with a URL "http://www.altavista.com/page13.html", on IE4 gives:

AltaVista—web and newsgroup search engine.—http://www.altavista.com/

AltaVista Email—http://altavista.iname.com/

AltaVista Translation Service—translate web pages or text between English and German, French, Portuguese, Spanish, and Italian.—http://babelfish.altavista.digital.com/

AltaVista Australia—mirror site providing Australian, New Zealand, and Pacific Rim users with faster access.—http://altavista.senet.com.au/

AltaVista Clinton Impeachment Trial Video—search video of President Clinton's impeachment trial by word or phrase.—http://video.altavista.com/impeach/

Related Yahoo Categories

Business and Economy>Companies>Internet Services>Search and Navigation>AltaVista Regional>U.S. States>Virginia>Cities>Altavista Computers and Internet>Software>Reviews>Titles>System Utilities>Utilities>File>AltaVista Search My Computer Business and Economy>Companies>Computers>Hardware>Systems>Manufacturers>Digital Equipment Corporation>Divisions>AltaVista Software Since the search as described above is done when the page is not found, the search takes time. The actual amount of time that it takes depends upon the quality of the search engine. In addition to the problem of the time that it takes for the search, the bigger problem is the fact that the search typically returns results that are not usable.

As such, it is a problem for users when a Web page can not be found. Users want to be able to reach some Web page that can be considered to be the next closest piece of information to the unfound Web page.

It should be noted that the HTTP protocol does provide an error code to indicate that a link has moved to a new URI. The HTTP protocol states:

301 Moved Permanently

The requested resource has been assigned a new permanent URI and any future references to this resource SHOULD use one of the returned URIs. Clients with link editing capabilities ought to automatically re-link references to the Request-URI to one or more of the new references returned by the server, where possible. This response is cacheable unless indicated otherwise. The new permanent URI SHOULD be given by the Location field in the response. Unless the request method was HEAD, the entity of the response SHOULD contain a short hypertext note with a hyperlink to the new URI(s). If the 301 status code is received in response to a request other than GET or HEAD, the user agent MUST NOT automatically redirect the request unless it can be confirmed by the user, since this might change the conditions under which the request was issued.

Although it would be very beneficial to receive a new URI reference as provided for above, the problem is that very few Web Server maintainers use this facility. There are also situations where the requested resource will just "go away" and not have a new URI reference.

When a user bookmarks a page on a Web browser, this indicates that the reader has an interest in that page. Hence, even if that page is not found on the Web server, when a user clicks on a bookmark it would be desirable for the Web client itself to go to a "close enough" or "next nearest" page. The Web client should be able to go to another page that is close enough to the desired page independently of whether or not the Web Server maintainer implements code 301 from the HTTP Protocol. In addition, it would be desirable if the user could go to the "close enough" page without searching for it, even if a search were at all possible. A "close" or "proximate" page is usually good enough for the user in many situations.

SUMMARY OF THE INVENTION

The system, method and program of the invention stores other close pages along with the bookmark for a page. This is done in the background in the spare cycles of the client by creating a hyperlinking site-map of the server. On clicking a bookmark, if the page is not found, another close page is obtained by the client. This technique requires that the basic structure of the Web Server is approximately intact. If the technique does fail, the client goes to the root document or home page of the Web server.

More specifically, the system, method, and program of the invention use web crawling techniques to create a site map which indicates the hyperlink structure of the site containing the desired page. Chains of hyperlinks from the desired page back to the root or home page are then stored along with the bookmark at the time of bookmarking.

If a page disappears from the site, the links in the chain are followed back from that page to the root page until a next available page is found. This next available page is presented to the user when the bookmark for the desired page is selected.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
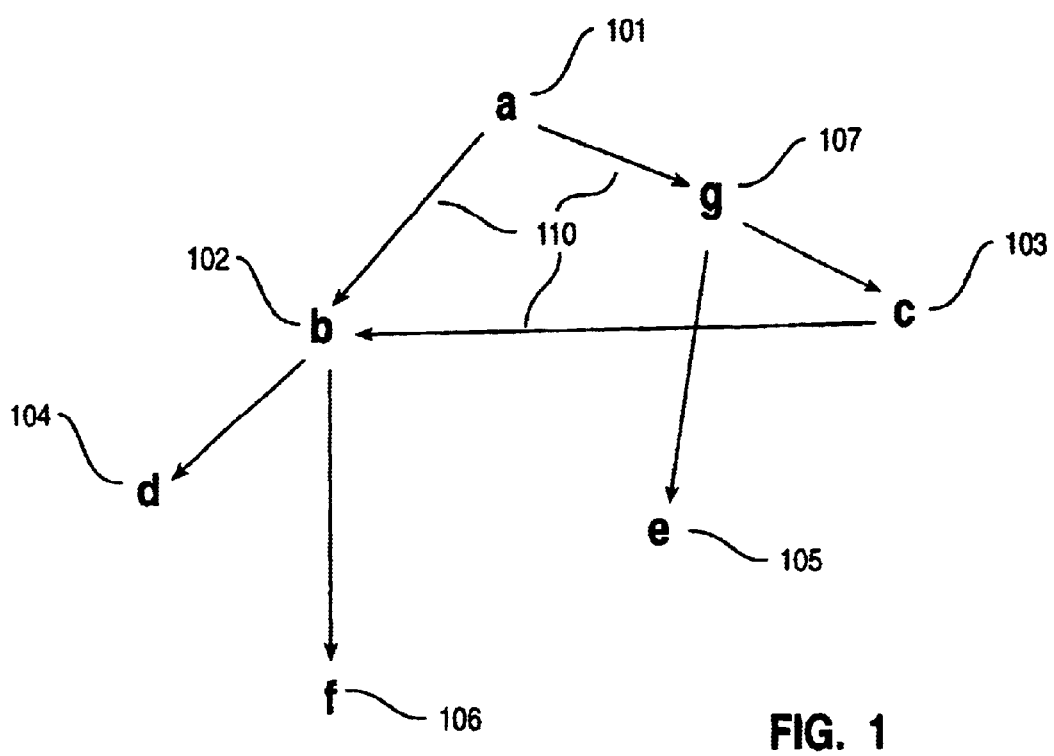
FIG. 1 is a map of pages of a Web server showing the hyperlink structure among the pages.

The preferred embodiment is described with reference to an example in which a user bookmarks a page "d" 104 as shown in FIG. 1. FIG. 1 shows a link map, also referred to herein as a site map, of the pages of a Web server at the time the bookmark is made. Each of the letters a, b, c, d, e, f, g, 101–107, represent a separate page. The arrows 110 show the hyperlink structure among the pages. In this example, the client views page "d" 104, and bookmarks this page d.

Figure 2:
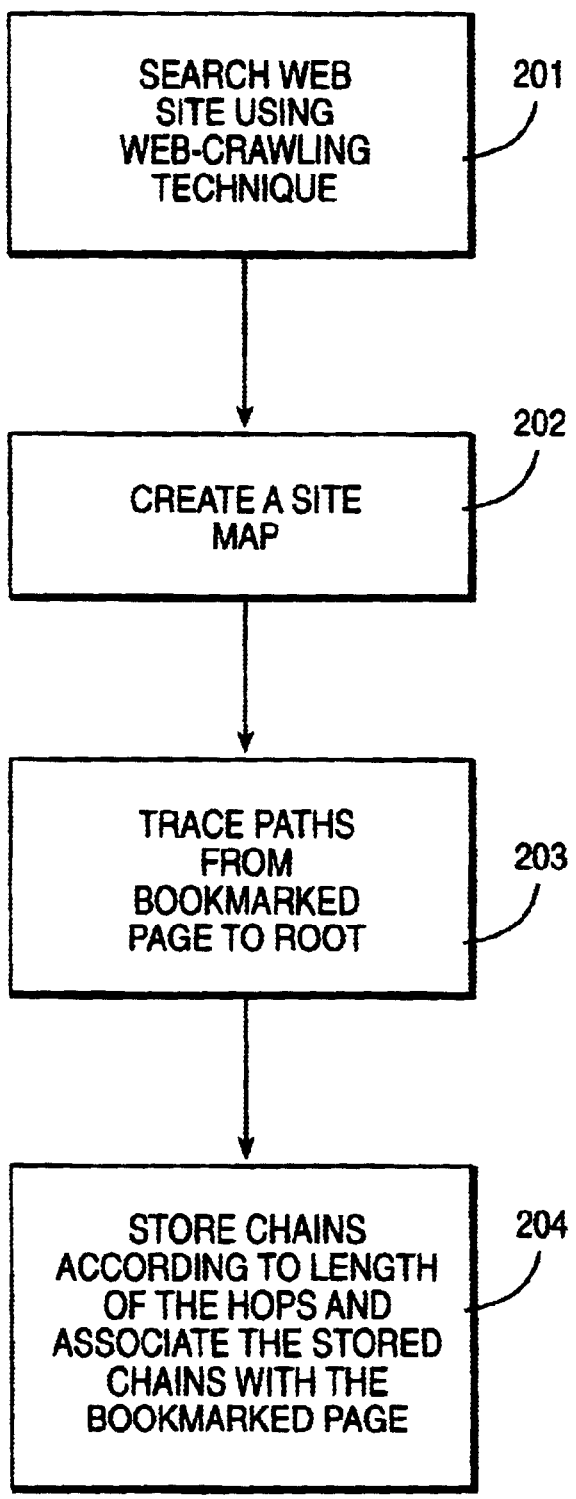
FIG. 2 illustrates the method steps, means, and program function for creating a site map, tracing paths from the bookmarked page to the root, and storing the path chains in association with the bookmarked page.

FIG. 2 shows the method, means and program function that are carried out in the background in the spare cycles of the client at the time of bookmarking, i.e., when the client bookmarked page "d". The necessary part of the Web site is searched using traditional web-crawling techniques, 201. A site map is created showing the pages and hyperlink structure among the pages, 202, as illustrated in FIG. 1. Then the paths from the bookmarked page, e.g., page "d" 104, to the root of the Web site, e.g., page "a" 101, is traced, 203. The chains for the paths are stored according to the length of the hops; and are associated with the bookmarked page, "d", 204.

With reference to FIG. 1, the two chains associated with bookmarked page "d" 104 are as follows:

chain 1) d→b→a
and
chain 2) d→b→c→g→a

The first chain, d→b→a, has three hops and the second chain, d→b→c→g→a, has 5 hops. These chains are stored along with the bookmarked page in relation to the length of the chains in terms of the number of hops.

Figure 3:
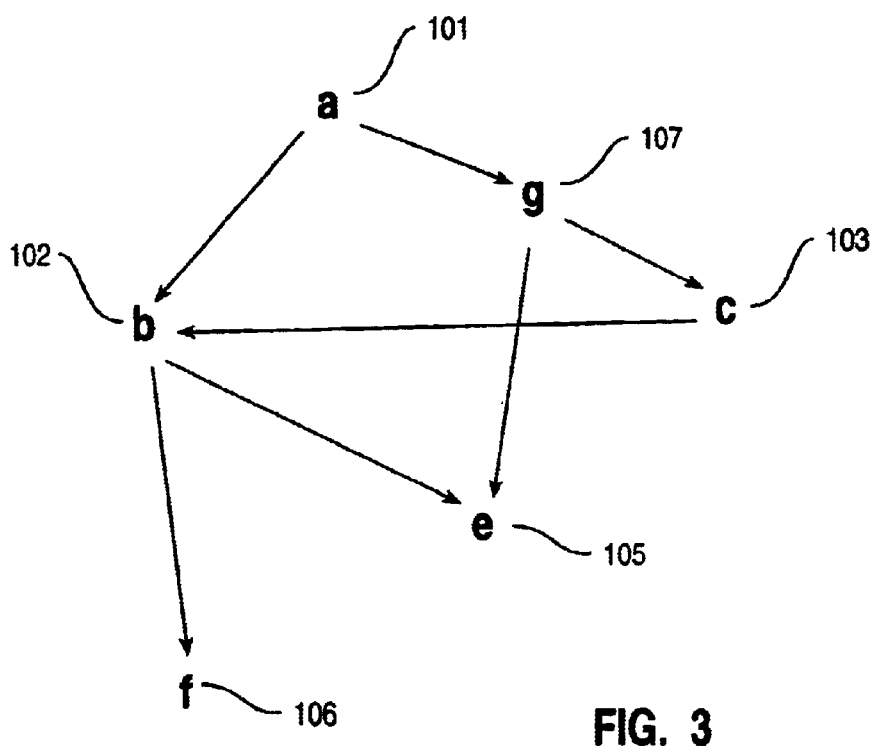
FIG. 3 illustrates a rearrangement of the Web site where the bookmarked page is eliminated.

Continuing with the example, the Web server rearranges the pages at some future time. FIG. 3 illustrates this rearrangement where page "d" is eliminated and "e" is hyperlinked to "b". After the server performs this rearrangement, if the client clicks on bookmark "d", the web client receives a "404 Not Found" error via HTTP from the server.

The Web client examines one of the chains, e.g., chain 1, that was stored with the bookmark for page "d". The chain is traversed to reach "b". The client then requests page "b" 102 from the Web server. As shown in FIG. 3, page "b" is available. This enables the Web client to get a next closest available page to the bookmarked page "d".

There are many ways of finding the next closest available pages by constructing the linkage structure of the Web server site and storing a list of prioritized close pages. There are also many ways in which a Web crawler can search a web-site and construct a site map as further described.

In the preferred embodiment of this invention, a Web crawler is an automated program that works as follows. As opposed to a user clicking on a hyperlink, the crawler downloads a Web page from the Web and searches it for the hyperlinks inside of it. Then, it picks a hyperlink and jumps to that page. From there it jumps to another hyperlink and the process continues. In this way, it creates a site map for a Web site by exhaustively looking at all of the hyperlinks in a site. The site map contains all of the links and the relationships between the links, as shown in FIG. 1.

Essentially, the crawler does a depth first or breadth first search of a Web site such that it discovers all of the hyperlinks. Other types of search techniques and modifications of breadth-first or depth-first techniques are also possible.

Qualitatively, for a depth first search, the crawler follows the links as deeply as it can into the site, and then backs up to follow other links. A crawler that does a depth first search of a Web site to build the site map shown in FIG. 1 does the following sequence of steps:

1) Downloads page a and finds hyperlinks b and g
2) Downloads b and finds hyperlinks d and f
3) Downloads d
4) Downloads f
5) Downloads g and finds hyperlinks e and c
6) Downloads e
7) Downloads c and finds hyperlink b
8) From the above information, the crawler creates the site map as shown in FIG. 1.

It should be noted that since it has already downloaded b, it does not have to download it again after step 7.

The crawling could have been done in other ways. For example, in a breadth first search, qualitatively, the crawler is following links level by level. For such a breadth first search of the Web site, the crawler would follow the following sequence of steps:

1) Download a and find hyperlinks b and g
2) Download b and find hyperlinks d and f
3) Download g and find hyperlinks e and c
4) Download d
5) Download f
6) Download e
7) Download c and find hyperlink b
8) From the above information, the Web crawler creates the site map as shown in FIG. 1.

Again, it should be noted that since it has already downloaded b, it does not have to download it again after step 7.

It should also be noted that the crawler can search a web-site and construct a site map of the site in many ways. The depth first and breadth first scheme illustrated in the embodiment are representative schemes. The representation of the site could be in the form of a tree, graph, table or some other form.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or ore computer programs, and/or data files accessible from one or more computer usable devices, carriers, or media. Examples of computer usable mediums include, but are not limited to: nonvolatile, hard-coded type mediums such as read only memories (ROMs) or erasable, electrically programmable read only memories (EEPROMs), recordable type mediums such as floppy disks, hard disk drives, CD-ROMS, DVDs and transmission type mediums such as digital and analog communication links, or any signal bearing media.

The foregoing description of the preferred embodiments of the invention has been presented for the purposes of illustration and description. It is not intended to be exhaustive or to limit the invention to the precise form disclosed. Many modification and variations are possible in light of the above teaching. For example, although preferred embodiments of the invention have been described in terms of the Internet, other network environments including but not limited to wide area networks, intranets, and dial up connectivity systems using any network protocol that provides basic data transfer mechanisms may be used.

Figure 4:
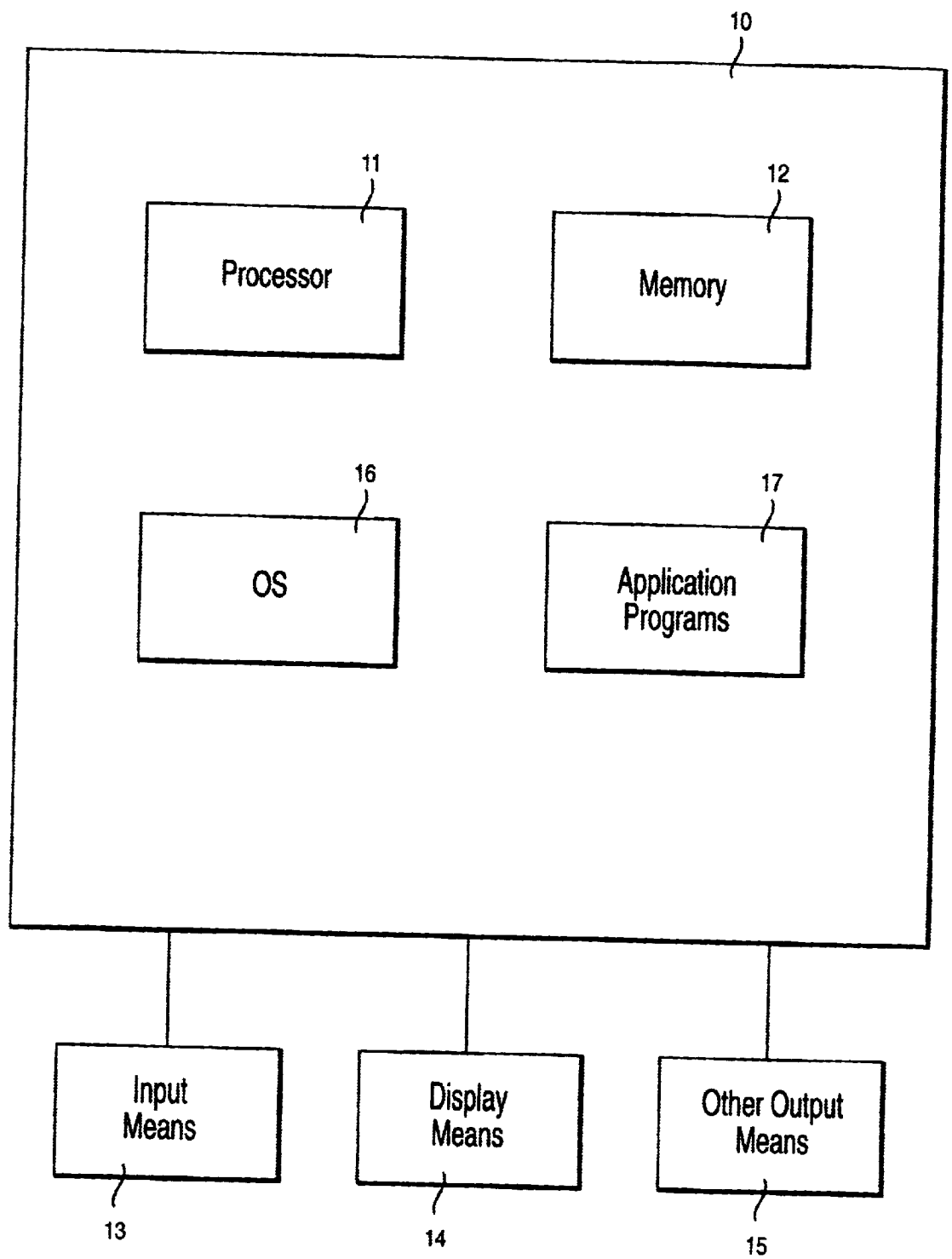
FIG. 4 is a block diagram of a computer system.

FIG. 4 depicts a block diagram of a typical computer system used as a client or server or both. The computer includes at least one processor 11 and memory 12. The computer may be, but is not limited to, a personal computer, laptop, workstation, mainframe or hand held computer including palmtops, personal digital assistants, smart phones, cellular phones, etc. The computer system includes input means 13 such as keyboard, mouse, track ball, light pen, pen-stylus, voice input system, touch sensitive device, and/or any other input means. Also included are display means 14 and/or any other output device including network communication devices. Memory 12 includes volatile or nonvolatile storage and/or any combination thereof. Volatile memory may be any suitable volatile memory device, e.g., RAM, DRAM, SRAM, etc. Nonvolatile memory may include storage space, e.g., via the use of hard disk drives, tapes, etc., for data, databases, and programs. The programs in memory include an operating system 16 and application programs 17.

The exemplary embodiment shown in FIG. 4 is provided solely for the purposes of explaining the preferred embodiments of the invention; and those skilled in the art will recognize that numerous variations are possible, both in form and function. For instance, any one or more of the following—the processor and/or memory and/or the input/output devices—could be resident on separate systems such as in a network environment.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims:

What is claimed is:

1. A method of bookmarking a page from a Server, comprising:
    at a time of bookmarking the page, searching the Web site of the bookmarked page to determine each path from the bookmarked page to home page;
    storing with the bookmark, a separate chain for each path; and
    prioritizing the chains stored with the bookmark based upon a numerical ordering of a number of hops in each chain.

2. The method of claim 1 further comprising finding a closest page having a minimal number of hops from the bookmarked page by traversing the prioritized chains.

3. The method of claim 1 further comprising:
    following at least one of the chains for a next available page if the bookmark for the page is selected and the page is not found; and
    displaying the next available page in lieu of the bookmarked page.

4. The method of claim 1 wherein the step of searching the Web site further comprises creating a site map of the Web site.

5. A method of bookmarking a page from a Server, comprising:
    constructing a link map of the Web server site at bookmarking time;
    associating with the bookmark at least one close link having a minimal number of hops from the page as indicated by the link map; and
    displaying the close link in lieu of the page if the page is not found.

6. A computer system having means for bookmarking a page from a Server, comprising:
- at a time of bookmarking the page, means for causing a search of the Web site of the bookmarked page to determine each path from the bookmarked page to a home page;
- storing with the bookmark, a separate chain for each path; and
- means for prioritizing the chains stored with the bookmark based upon a numerical ordering of a number of hops in each chain.

7. The computer system of claim 6 further comprising means for finding a closest page having a minimal number of hops from the bookmarked page by traversing the prioritized chains.

8. The computer system of claim 6 further comprising:
- means for following at least one of the chains for a next available page if the bookmark for the page is selected and the page is not found; and
- means for displaying the next available page in lieu of the bookmarked page.

9. The computer system of claim 6 wherein the means for searching the Web site further comprises means for creating a site map of the Web site.

10. A computer system having means for bookmarking a page from a Server, comprising:
- means for constructing a link map of the Web server site at bookmarking time;
- means for associating with the bookmark at last one close link having a minimal number of hops from the page as indicated by the link map; and
- means for displaying the close link in lieu of the page if the page is not found.

11. A computer program on a computer usable medium having computer readable program code means, comprising:
- means for bookmarking a page from a Server;
- at a time of bookmarking the page, means for causing a search of the Web site of the page to determine each path from the page to a home page;
- means for storing with the bookmark, a separate chain for each path; and
- prioritizing the chains stored with the bookmark based upon a numerical ordering of a number of hops in each chain.

12. The program of claim 11 further comprising:
- means for following at least one of the chains for a next available page if the bookmark for the page is selected and the page is not found; and
- means for displaying the next available page in lieu of the page.

13. The program of claim 11 wherein the means for causing a search of the Web site further comprises means for causing a creation of a site map of the Web site.

14. A computer program on a computer usable medium having computer readable program code means, comprising:
- means for bookmarking a page from a Server,
- means for constructing a link map of the Web server site at bookmarkingtime;
- means for associating with the bookmark at least one close link having a minimal number of hops from the page as indicated by the link map; and
- means for displaying the close link in lieu of the page if the page is not found.

\* \* \* \* \*